United States Patent [19]
Guerster et al.

[11] 3,743,267
[45] July 3, 1973

[54] ENERGY ABSORBING DEVICE

[75] Inventors: Rene L. Guerster, Maple Glen; Leigh David Leiter, Willow Grove, both of Pa.

[73] Assignee: Ametek, Inc., New York, N.Y.

[22] Filed: Nov. 19, 1971

[21] Appl. No.: 200,299

[52] U.S. Cl. ................................................. 267/74
[51] Int. Cl. ............................................. F16f 1/22
[58] Field of Search....................... 267/174, 74, 180, 267/175, 177; 242/54

[56]  References Cited
UNITED STATES PATENTS

| | | | |
|---|---|---|---|
| 794,562 | 7/1905 | Stabe | 267/74 |
| 3,463,329 | 9/1969 | Giltner | 242/54 |
| 2,131,739 | 10/1938 | Hoyt | 267/180 |

Primary Examiner—James B. Marbert
Attorney—Smith, Harding et al.

[57] ABSTRACT

A self-erecting device has a base on which is mounted a self-erecting tube. An energy absorbing coil of wire has one end connected to the outer end of the tube and the other end connected to the base. The erection of the tube extends the coil beyond its elastic unit to absorb energy by deformation in the plastic range.

4 Claims, 5 Drawing Figures

Patented July 3, 1973 3,743,267
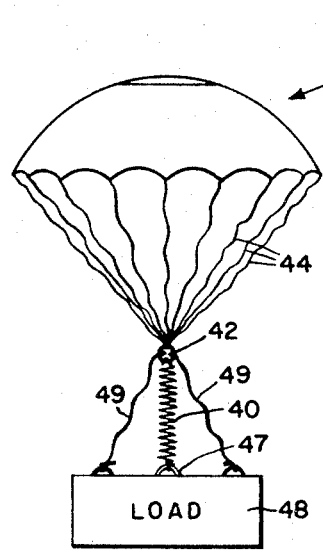
FIG. 4.
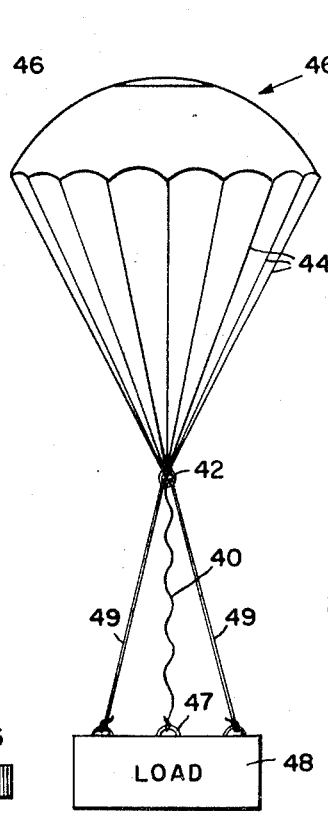
FIG. 5.
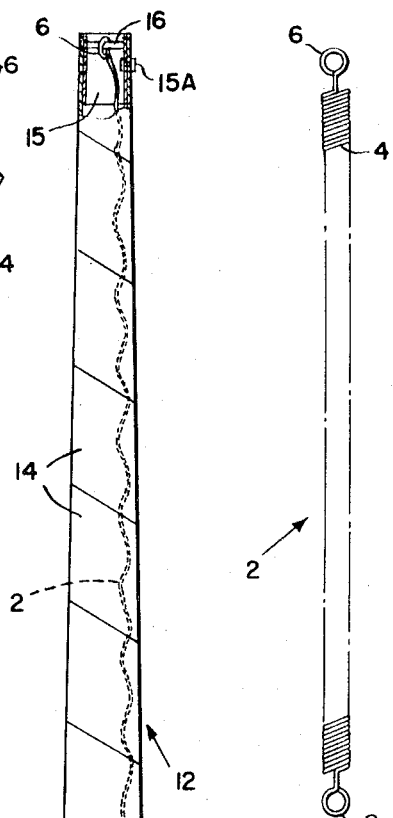
FIG. 1.
FIG. 2.
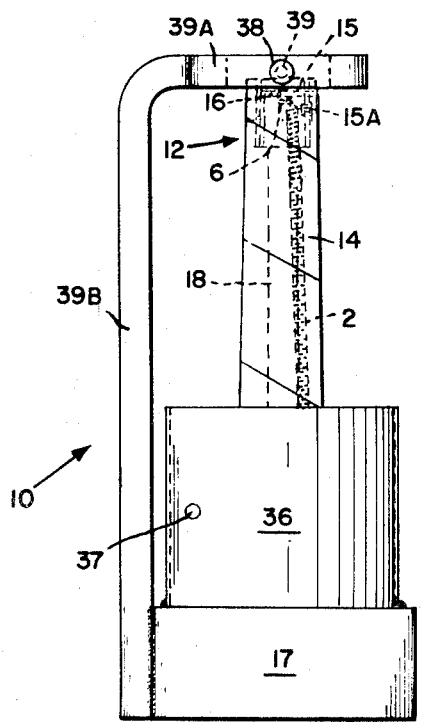
FIG. 3.
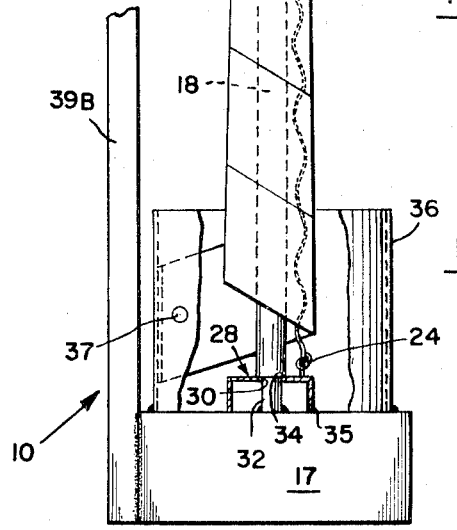
INVENTORS
RENE L. GUERSTER &
LEIGH DAVID LEITER
BY
ATTORNEYS

ENERGY ABSORBING DEVICE

BACKGROUND OF THE INVENTION

It is known to absorb energy from a self-erecting device, as is seen in U. S. Pat. No. 3,680,802. As detailed hereinafter, such absorbtion of energy is useful in a number of applications such as, for example, in connection with self-erecting tubes in satellite applications where the spin rate of the satellite and the normal high velocity extension of the tube imposes severe dynamic loading on the tube. The heretofore known self-erecting tube devices incorporating energy absorbing means have been relatively complex, expensive and involving a substantial weight penalty which is particularly objectionable for space applications. The self-erecting tube device of this invention incorporating an energy absorber solves these problems.

SUMMARY OF THE INVENTION

A self-erecting device has a base on which is mounted a self-erecting tube. An energy absorbing coil of wire within the tube has one end connected to the outer end of the tube and the other end connected to the base. The erection of the tube extends the coil beyond its elastic unit to absorb energy by deformation in the plastic range.

DESCRIPTION OF THE DRAWINGS

FIG. 1 is a front elevation of an energy absorbing helical coil of wire employed in the invention, FIG. 2 is a front elevation partially broken away, of an energy absorbing device in accordance with the invention, FIG. 3 is a view of the device of FIG. 2 showing the device before the absorption of energy by the energy absorbing coil of wire, FIG. 4 is a front elevation of an alternative embodiment of the invention, and FIG. 5 is a view of the device of FIG. 4 after the energy absorbing coiled wire has been displaced.

PREFERRED EMBODIMENT

An energy absorber in the form of a helical coil 2 of ductile wire, for example, copper wire, with individual coils 4 close together has closed hook ends 6 and 8 as best seen in FIG. 1.

Referring now to FIG. 2, the energy absorber coil 2 is shown in association with a self-erecting spiral tube device 10 which has a tube 12 formed from a helical ribbon spring 14 having adjacent turns set to tightly coil in overlapping and telescoping engagement. A tip tube 15 secured in the upper end of tube 12 by rivet 15A supports a cross bar 16 passing through end 6 of coil 2. The device 10 has a base 17 on which is fixedly secured a guide pin 18. End 8 of coil 2 is closed about an eye 24 secured to the top of cup member 28. Cup member 28 has an opening 30 which encompasses a reduced portion 32 of guide pin 18 and abuts against peripheral shoulder 34 of guide pin 18. The bottom periphery 35 of cup member 28 rests on base 17.

A cylindrical member 36 is mounted on base 17 and has secured thereto the outermost wrap of tube 12 by a rivet 37 which permits the outermost wrap to pivot with respect to member 36 when the tube 12 is collapsed within or erects from member 36. Tube 12 is collapsed in the storage position within member 36. As best seen in FIG. 3, tube 12 is maintained in the collapsed position by means of a headed pin 38 which passes through opposed openings 39, 39 (only one being shown) in collar 39A which is an integral part of member 39B attached to base 17. The removal of pin 38 from openings 39, 39 releases tube 12 for extension upwardly through collar 39A.

The above described combination of tube 12, base 17, cylindrical member 36 and guide pin 18 are well known in the art being fully described in U.S. Pat. No. 3,267,329 dated Sept. 16, 1969, the disclosure of which is herein incorporated by reference.

When the tube 12 is released and erects, the energy absorbing coil 2 is extended in the position shown in FIG. 2. The deformation of the coils 4 results in a relatively uniform absorption of energy as the tube erects with an increased absorption of energy near the end of the erection as the coils 4 approach a straightened condition. As tube 12 erects it rotates carrying the energy absorber coil 2 with it. The bodily rotation of coil 2 is permitted since cup 28 rotates freely about pin 18. In some applications the pin 18 is eliminated in which event the cup may be fixed against rotation. The rate of extension of the tube is reduced a predetermined amount. This is important, for example, in satellite applications where the spin rate of the satellite and the normal high velocity extension of the self-erecting tube imposes severe dynamic loading on the self-erecting tube device.

An alternative embodiment is shown in FIG. 4 in which there is shown an energy absorbing wire coil 40 secured at its upper end by ring 42 to shroud lines 44 of a parachute 46. The lower end of coil 40 is connected by ring 47 to a load indicated at 48 which is also connected to the shroud lines 44 by lines 49 through ring 42.

When parachute 44 opens, shroud lines 44 become taut and coil 40 extends until lines 49 become taut. In FIG. 4 the coil 40 is being extended to absorb the shock occurring on the opening of parachute 46. In FIG. 5 the device of FIG. 4 is shown with the lines 49 supporting the load 48 with the energy absorbing coil 40 having been extended its full design distance. If desired, lines 49 can be eliminated relying solely on the extended coil 40 to support load 48.

The above embodiments are intended to be illustrative and not limiting.

We claim:

1. In combination with a self-erecting device having a base and a self-erecting tube, an energy absorbing coil of wire within the tube having one end connected to the outer end of the tube and other end connected to the base, the erection of the tube extending the coil beyond its elastic limit to absorb energy by deformation in the plastic range.

2. The combination of claim 1 in which the self-erecting device is a tube formed from a helical ribbon spring having adjacent turns set to tightly coil in overlapping and telescoping engagement.

3. The combination of claim 2 having a guide pin mounted on the base and in which the other end of the coil of wire is connected to the base by rotatable means co-axial with the guide pin.

4. The combination of claim 2 having releasable means engaging the top of the tube to hold the tube in a collapsed position comprising a collar and a releasable stop member engaging the collar.

* * * * *